Feb. 25, 1964 B. DIAZ 3,121,931

TAPE CONNECTOR

Filed Aug. 1, 1961

INVENTOR
BENNY DIAZ

BY J. Donald Weber, Jr.
AGENT

United States Patent Office 3,121,931
Patented Feb. 25, 1964

3,121,931
TAPE CONNECTOR

Benny Diaz, Sewell, N.J., assignor to Sperry Rand Corporation, New York, N.Y., a corporation of Delaware Filed Aug. 1, 1961, Ser. No. 128,504
3 Claims. (Cl. 24—225)

This invention relates to a tape connector. In particular, this invention relates to a tape connector for linking two tape elements so as to effect a continuous length of tape.

Many types of information storage apparatus, often called tape handlers, utilize magnetic or other types of tape, for example Mylar or the like. When used as an information storage medium, these tapes are often used with equipment which are utilized with large scale business machines for example. In a typical piece of equipment such as that described supra, the apparatus includes a reel for storing the tape thereon. Attached to this reel is a short length of tape often called a reel leader. This reel leader may be of the same type of material as the storage tape, or in the alternative, the leader may be comprised of a short length of plastic or the like. At the end of this leader is a clip which is often referred to as a reel clip. The reel clip is adapted to engage a further clip which is termed a leader clip and which is attached to the tape which is to be used in the equipment.

Clips of this nature are known in the art. However, many of these clips have inherent disadvantages. For example, the clip may be inflexible whereby the tape may be caused to move improperly through the equipment, as for example around a transducer head, whereby the tape may become tangled and disengaged from the storage reel.

In addition, many of these tapes are used in conjunction with vacuum or pressurized boxes or sections whereby the speed of the tape movement through the system can be more readily controlled. See for example, J. A. Weidenhammer et al., Tape Feed Mechanism, U.S. Patent Number 2,792,217. It will be clear, that if the tape connector has a substantially open configuration, the tape surface continuity is destroyed. Consequently a pressure leak is encountered whereby the pressure in the system will change when the connector passes therethrough and the effectiveness of the pressurized system will be quickly destroyed. With the destruction of the pressurized system, control of the tape during its movement may be lost and the tape again may become disengaged from the reel on which it should be stored.

The present invention contemplates the provision of an extremely small tape connector which provides a substantially continuous closed surface relative to the pressurized system while remaining flexible and being sufficiently small that there is no deleterious effect as the tape passes through the equipment as for example over transducer heads as described supra. No claim is laid to the pressurized system per se.

In a preferred embodiment, the tape connector comprises two clips fabricated of a suitable plastic-like material. Each of these clips is connected to the associated tape end. Furthermore, while the two members are engaged, an aperture in one clip is substantially filled by the engaging end of the other clip whereby a substantially continuous closed surface is provided.

Clearly, one object of this invention is to provide an inexpensive tape connector.

Another object of this invention is to provide a tape connector which eliminates an air gap in the tape surface.

Another object of the invention is to provide a tape connector which eliminates an air gap in the surface of the tape thereby avoiding the necessity of maintenance to the tape and the tape handling equipment.

Another object of the invention is to provide a tape connector which has a substantially closed surface and permits different pressure magnitudes on the opposed surfaces thereof.

Another object of this invention is to provide a tape connector which is fabricated of a flexible material.

Another object of this invention is to provide a tape connector which is extremely small in size.

These and other objects of this invention will become more readily apparent following a reading of the description in conjunction with the attached drawings in which.

Figure 1:
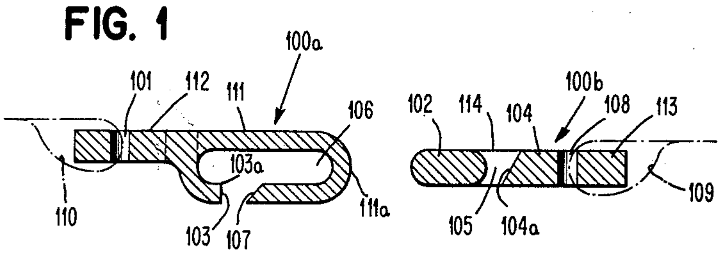
FIGURE 1 is a cross-sectional side view of the tape connector, with the separate clips disengaged.

Referring now to FIGURE 1, there is shown a cross-sectional view of the tape connector. The tape connector comprises two clips. The clips are designated as reel clips **100*a* and leader clip 100*b*. It should be understood that the clips may, in fact, be used to connect any two tape sections and the use is not limited to a tape and reel leader arrangement. Reel clip 100*a* has a substantially C-shaped configuration (in a cross-sectional view). That is, the main portion 111 of the clip 100*a* has curved portions which bend around to the ends 103 and 107 thereby enclosing a central aperture 106. From one of the curved end portions of the C-shaped configuration, there extends an arm 112. Included in this arm is a narrow substantially rectangular aperture 101. The aperture 101 is provided for passing the tape therethrough thereby providing for engagement with the clip as suggested by the dashed lines 110**.

Leader clip **100*b* has a substantially rectangularly shaped configuration (in a cross sectional view). The clip 100*b* comprises three main sections. These sections are an oblate or flattened cylinder 102, a member 104 shaped substantially like a trapezium and a rectangular member 113. It will be seen in referring to FIGure 2 that each of these elements is connected together by side portions 114. Between the members 104 and 113 there is an aperture 108 through which passes the tape 109 (shown dashed) whereby the clip engages the tape. In addition, an aperture 105 lies between the members 102 and 104**.

The clips are then engaged by passing the oblate cylinder 102 of leader clip **100*b* through the narrow opening between ends 103 and 107 of the C-shaped configuration of member 100*a*. Simultaneously, the end 107 of clip 100*a* is passed through the opening 105 of clip 100*b*. This then causes an engagement of the two clips such that the oblate cylinder 102 of leader clip 100*b* is located within the aperture 106 of reel clip 100*a*. A slight tensile force will assure that the cylinder 102 remains in the aperture 106**.

In a preferred embodiment, the thickness of leader clip **100*b* (for example the thickness of the oblate cylinder 102) may be on the order of 0.5 millimeter. Therefore, the inside spacing of opening 106 (between end 107 and rear portion 111 of reel clip 100*a*) must also be on the order of 0.5 millimeter. A typical embodiment using these dimensions has been constructed whereby the outside dimension of reel clip 100*a*** is on the order of 1.0 millimeter. The length of each of the tape clips is on the order of 5.0 millimeters and the overall width of the tape clip is on the order of 10 millimeters. It should be clear, that this type of tape connector can be fabricated with extremely small dimensions and those shown are illustrative only. Of course, the material used in the fabrication of the clip must have sufficient inherent strength that the clip members remain engaged during operation.

Still referring to FIGURE 1, it will be seen that in reel clip 100*a* the end 107 of the clip is beveled. It should be understood, that this bevel is not absolutely necessary for the fabrication of an operable tape clip. However, for ease of inserting the cylinder 102 of leader clip 100*b* into opening 106 this bevel is advantageous. That is, the cylinder is capable of sliding along the bevel and into the aperture 106. If the bevel were removed, it may be seen that either there would be some difficulty in inserting the cylinder 102 into the opening 106 or that the opening between the ends 102 and 107 would be somewhat larger whereby the cylinder might slide out thereby disengaging the two clips. By the same token, it should be noted that the end 103 is shown as having a squared shape. This end should preferably be of this squared configuration and not be beveled. A bevel is not necessary at 103 inasmuch as the cylinder 102 will pass in through the aperture between end 103 and 107. However, once the cylinder is therein, if the end 103 was beveled, then the cylinder 102 could possibly slide back out through the opening between ends 103 and 107. Clearly, this is not desirable and, therefore, the square shape of end 103, and in particular the corner 103*a*, are desirable in this configuration.

In clip 100*b*, there is also shown a ramp or beveled side 104*a* on element 104. Again, this beveled ramp is not absolutely necessary for the proper operation of a clip. However, as in the case of bevel 107, the ramp 104*a* provides a desired freedom in engaging the two clips. Moreover, if the ramp was omitted so as to provide a sufficiently large aperture 105 through which end 107 of clip 100*a* could pass as easily, a larger aperture would be presented in the surface of the leader clip 100*b* (as will be easily seen in FIGURE 2) whereby the desired continuity of the tape surface would be destroyed.

Figure 2:
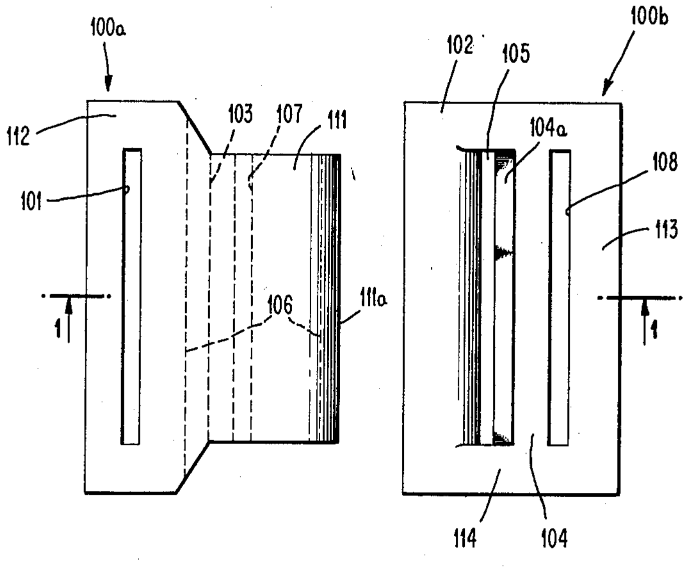
FIGURE 2 is a plan view of the top of the tape connector, with the separate clips disengaged.

Referring now to FIGURE 2, there is shown a top view of a plan for the two clips of the instant tape connector. In FIGURE 2, similar elements as shown in FIGURE 1 bear similar reference numerals. It will be seen in FIGURE 2, that the plan view configuration of the two clips is extremely simple. Moreover, it will be seen that when the end 107 of clip 100*a* is inserted through the aperture 105 of clip 100*b* curved end portion 111*a* will reside in the aperture 105 and the aperture will be substantially filled thereby, thus providing the continuous surface for the tape. Moreover, it will be seen that the narrow portion 111 of clip 100*a* is substantially overlapped by the wider portions of clip 100*b* whereby the area which represents an aperture in the tape surface may be greatly reduced. It has been shown by testing that the tape connector described provides an increased reliability in pressurized tape systems whereby the down time of the entire machine may be reduced.

As discussed with relation to FIGURE 1, it will be seen clearly in FIGURE 2 that the function of the beveled ramp 104*a* is desirable in reducing the air gap in the tape surface. That is, if the ramp 104*a* were eliminated the gap in the connector would be enlarged by the projected area of the removed ramp. It is seen in FIGURE 2 that this projected area is substantial.

Figure 3:
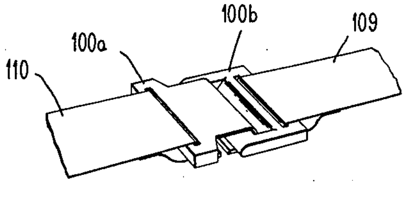
FIGURE 3 is a perspective view of the tape connector with the separate clips engaged and the tape ends connected thereby.

Reference is now made to FIGURE 3 which shows a perspective view of the two clips in the normal engagement. Again, similar components bear similar reference numerals to those of FIGURES 1 and 2. It is clear from FIGURE 3, that the end 111*a* of reel clip 100*a* is securely engaged by leader clip 100*b*. Although it is not entirely possible to show, it should be clearly understood that the oblate cylinder 102 is engaged within the opening 106 of clip 100*a*. Moreover, it will be seen that the effective air gap around the connectors and, therefore, in the continuous tape surface is substantially reduced so as to be negligible at most.

It is to be understood, that the embodiment shown and described supra is not to be limitative of the invention, but rather is to be interpreted as a preferred embodiment thereof. Moreover, although the preferred embodiment utilizes nylon as the material for the fabrication of the connectors, it is clear that other plastic or flexible material may be used. In addition, fabrication techniques may include molding, extruding, or injection molding. Again, other means of fabrication may be suggested to those skilled in the art. Consequently, this description is meant to apply to all connectors which fall within the scope of this invention and is not limited to the actual embodiments shown and described.

Having thus described the invention what is claimed is:

1. In a tape transport system, first and second tape ends, connector means comprising two mating members for connecting said tape ends together, a first member having a substantially rectangular surface configuration and a pair of substantially parallel apertures therethrough, each aperture of said pair of apertures being disposed parallel to opposite edges of said member but spaced away therefrom by different distances such that one of said edges is wider than the other, said first tape end being looped through one of said apertures and around the less wide edge of said first member, a second member having a substantially tapered configuration and a single elongated aperture through the wider end thereof, said second tape end looped through said last named aperture and around the edge of said second member, said second member including a doubled back portion of the smaller end thereof which forms a retaining section having a flat cylindrical configuration, a lip portion protruding from the wider end of said second member and terminating adjacent said doubled back portion, said retaining section being adapted to pass through the other one of said apertures in said first member and to engage the wider edges thereof thereby coupling together said first and second members and substantially filling said aperture passed through whereby an effectively closed connector and tape surface is provided, said lip portion being adapted to assure a positive coupling of the two mating members.

2. Connector means comprising two interlockable members, a first member having a substantially rectangular surface configuration and a pair of substantially parallel elongated apertures therethrough, said apertures lying along the long dimension of said first member and effectively defining edge portions thereof, at least one of said pair of apertures having formed sides adapted to improve the interlocking characteristic of said two members, at least one of said edge portions comprising a flattened cylinder, a second member with the ends thereof having a substantially rectangular surface configuration but with different widths, a single elongated aperture lying along the long dimension of the wider end of said second member, said second member including a doubled back portion of the smaller end to thereby form a retaining section, said retaining section having a flattened cylindrical configuration and being adapted to pass through one of said apertures in said first member and to engage the flattened cylinder edge portion thereof thereby coupling together said first and second members to provide a substantially closed surface and to inhibit relative rotation of the interlocked members, a lip-like portion extending from said wider member toward the end of said doubled back portion thereby to provide a closure for said retaining section, and tape means having one loop thereof engaged with the other aperture in said first member and another loop engaged with the aperture in said second member.

3. In combination first and second tapes having ends to be connected, connector means comprising two interlocking members for connecting said tape ends together, a first member having a substantially rectangular surface configuration and a pair of substantially parallel apertures therethrough such that said first member includes three parallel legs, one of said parallel legs having a flattened cylindrical configuration, said first tape end being looped through one of said apertures, a second member having a substantially T-shaped configuration and a single elongated aperture through the wide end thereof, said second tape end looped through said last named aperture, said second member including a doubled back portion of the small end thereof which forms a retaining section having a flattened cylindrical configuration, a lip portion protruding from the wide end of said second member and terminating adjacent to but spaced from said doubled back portion, said retaining section being adapted to pass through the other one of said apertures in said first member and engage said one of said parallel legs thereby interlocking said first and second members and substantially filling said aperture passed through whereby an effectively closed and continuous connector and tape surface is provided, said lip portion being adapted to assure a positive interlocking of the two mating members and to prevent undesirable decoupling thereof.

References Cited in the file of this patent

UNITED STATES PATENTS

| | | |
|---|---|---|
| 1,265,039 | Bower | May 7, 1918 |
| 2,455,929 | Hattan | Dec. 14, 1948 |
| 2,792,185 | Julliard | May 14, 1957 |